Sept. 13, 1955  G. X. BATLAS ET AL  2,717,403
AUTOMATIC HYDRAULIC BRUSH
Filed Feb. 19, 1951  4 Sheets-Sheet 1
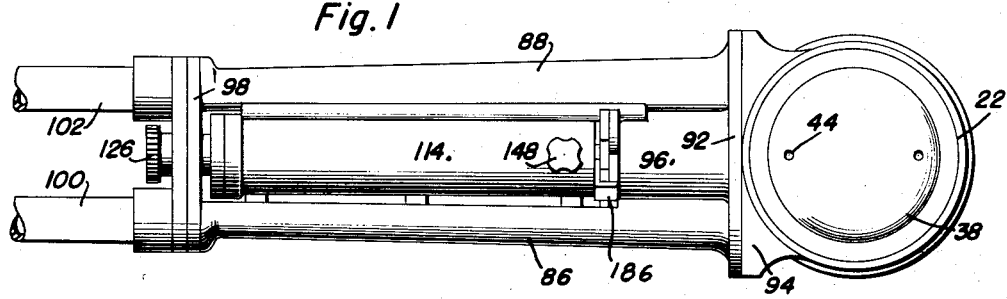
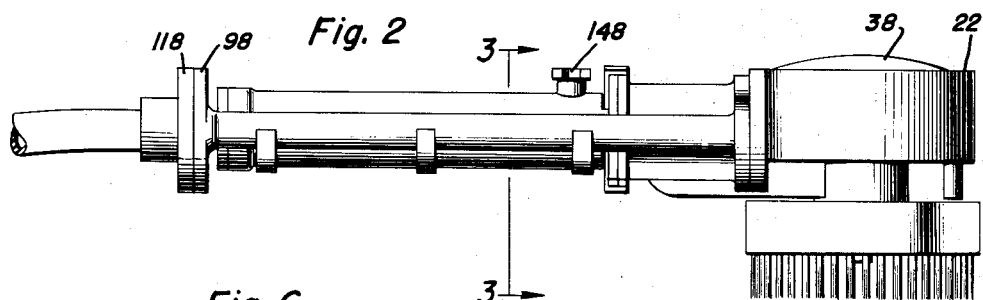
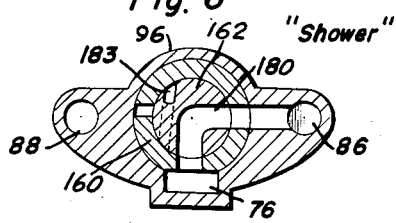
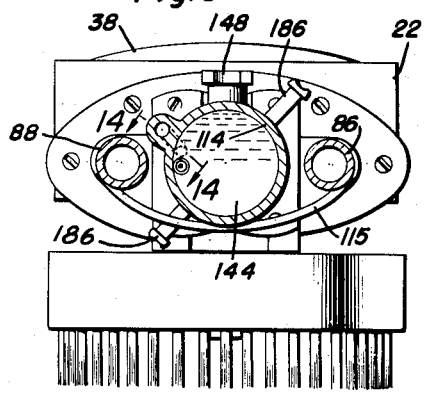
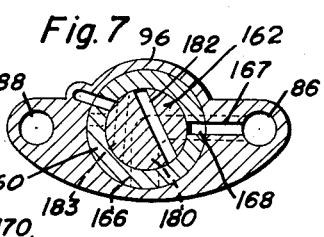
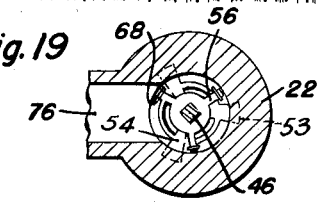
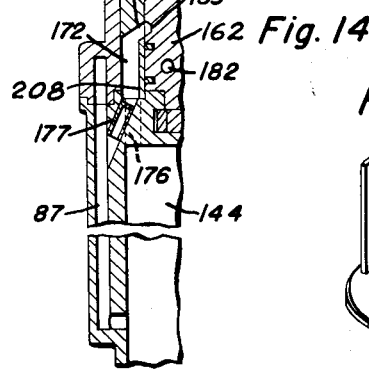
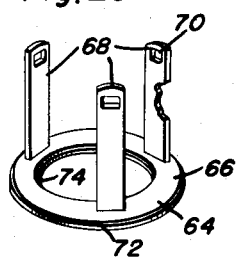
George X. Batlas
Emmanuel N. Pantazis
INVENTORS.

Sept. 13, 1955

G. X. BATLAS ET AL 2,717,403

AUTOMATIC HYDRAULIC BRUSH

Filed Feb. 19, 1951

George X. Batlas
Emmanuel N. Pantazis
INVENTORS.

BY *Clarence A. O'Brien*
*and Harvey B. Jacobson*
Attorneys

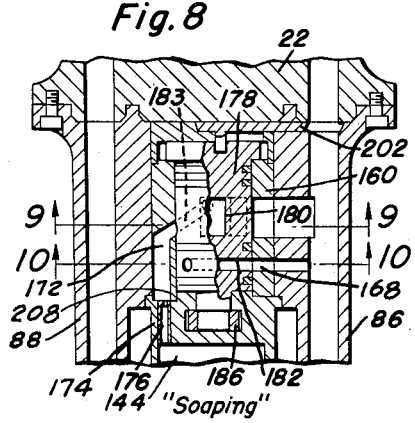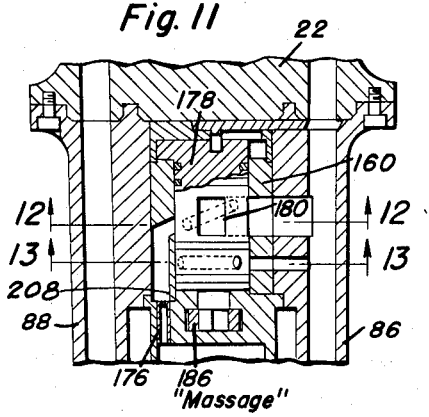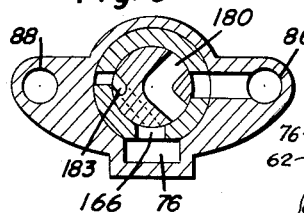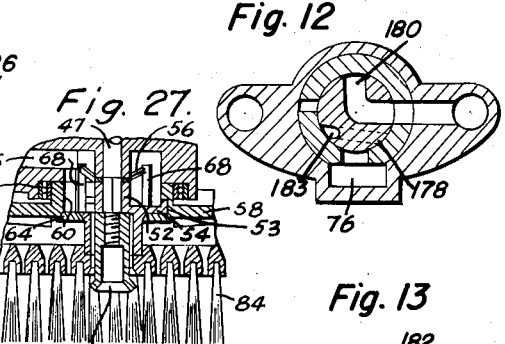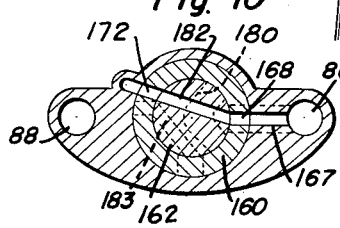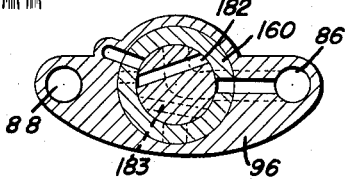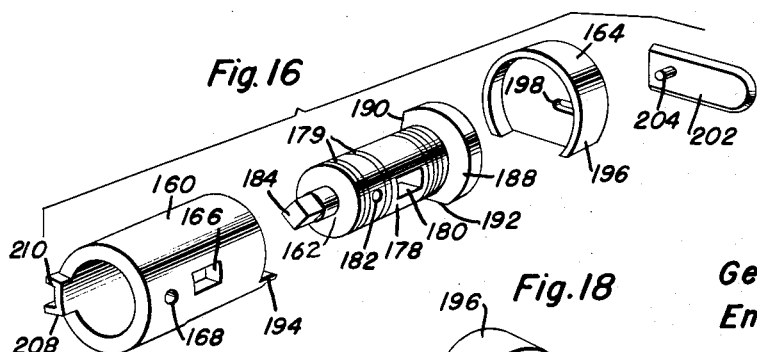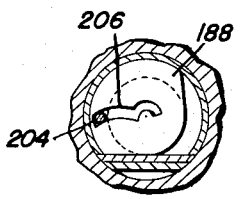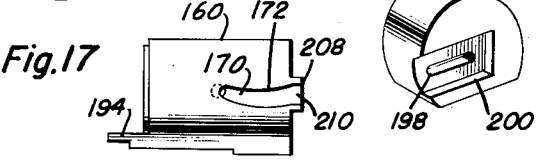

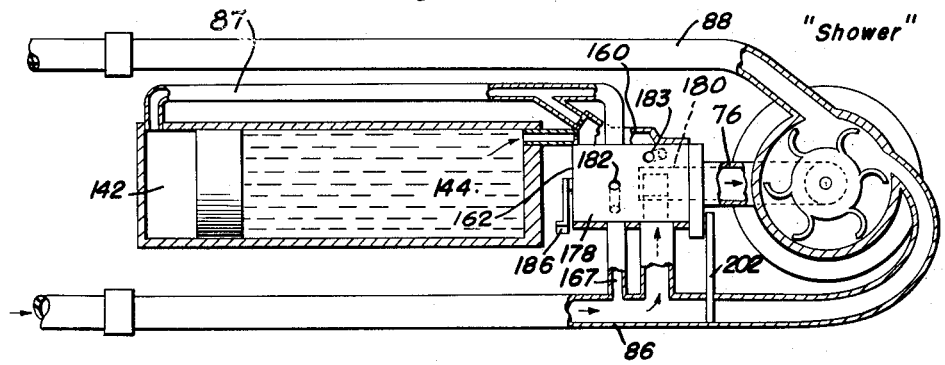
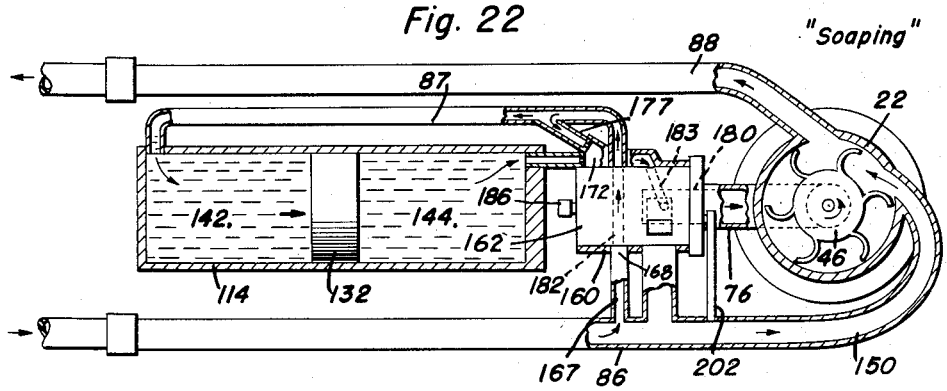
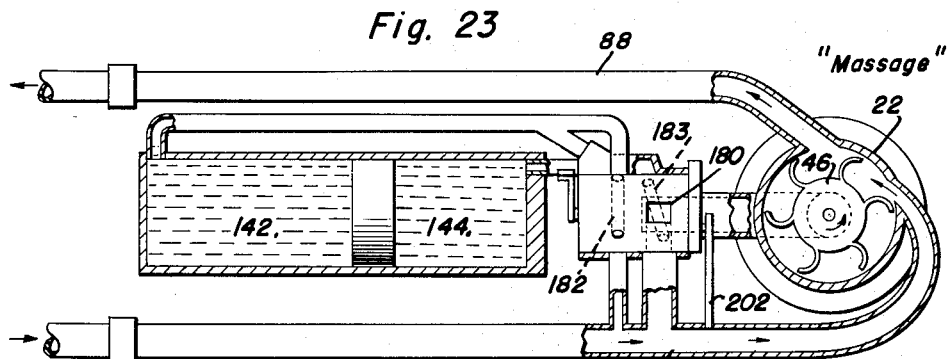
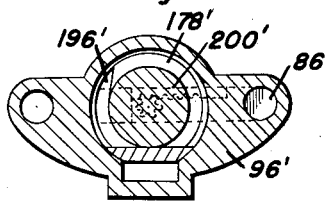
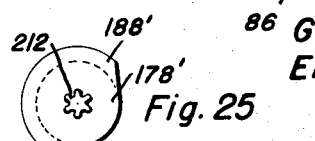
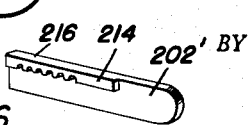

United States Patent Office 2,717,403
Patented Sept. 13, 1955

2,717,403
AUTOMATIC HYDRAULIC BRUSH
George X. Batlas, Astoria, and Emmanuel N. Pantazis, New York, N. Y.
Application February 19, 1951, Serial No. 211,726
3 Claims. (Cl. 15—29)

The present invention relates to improvements in brushes and more particularly to a brush which is adapted to be used in conjunction with a liquid and soap for cleansing purposes.

The primary object of my invention is to provide in a hydraulic brush having an impeller, a rotary perforated brush driven by the impeller and a liquid pressure inlet line to the impeller for driving the same, valve control means for feeding under pressure from the liquid inlet pressure line either a mixture of liquid soap and liquid from the pressure inlet line to the brush for performing soaping operations with the brush, or for feeding for shower purposes liquid under pressure from the liquid pressure inlet line directly to the brush while blocking off the liquid pressure inlet line from the impeller to render the impeller idle.

Another object is to accomplish feeding of the liquid soap from a container by a piston in the container operated by pressure from the liquid pressure inlet line under control of the valve.

Still another object is to provide for mixing the liquid soap with liquid from the liquid pressure inlet line under back pressure of liquid from the liquid pressure inlet line.

Still further objects of the present invention reside in the novel details of construction whereby the automatic hydraulic brush can be inexpensively manufactured and readily assembled.

Various other objects and advantages will become apparent from the detailed description to follow. The best form in which I have contemplated applying my invention is clearly illustrated in the accompanying drawings, wherein:

Figure 1 is a top plan view of the automatic hydraulic brush;

Figure 2 is a side elevational view of the brush of Figure 1;

Figure 3 is a vertical transverse sectional view taken substantially along the plane of line 3—3 of Figure 2;

Figure 6 is a vertical transverse sectional view taken substantially along the plane of line 6—6 of Figure 4;

Figure 7 is a vertical transverse sectional view taken substantially along the plane of line 7—7 of Figure 4;

Figure 8 is a longitudinal sectional view through the valve means of the present invention and showing the valve in "soaping" position;

Figure 9 is a horizontal transverse sectional view taken substantially along the plane of line 9—9 of Figure 8;

Figure 10 is a horizontal detail sectional view taken substantially along the plane of line 10—10 of Figure 8;

Figure 11 is a view similar to Figure 8 but wherein the valve is shown in "massage" position;

Figure 12 is a horizontal transverse sectional view taken substantially along the plane of line 12—12 of Figure 11;

Figure 13 is a horizontal transverse sectional view taken substantially along the plane of line 13—13 of Figure 11;

Figure 14 is a detail sectional view taken substantially along the plane of line 14—14 of Figure 3;

Figure 15 is a vertical transverse sectional view taken substantially along the plane of line 15—15 of Figure 4 and showing the means for operatintg the valve controlling the flow through the inlet conduit;

Figure 16 is a detail perspective exploded view of the valve, valve casing and second valve for controlling the flow through the inlet conduit;

Figure 17 is a side elevational view of the valve casing of Figure 16;

Figure 18 is a detail perspective view of the cap associated with the valve casing and valve with the means for effecting reciprocation of the second valve which controls the flow through the inlet conduit;

Figure 19 is a horizontal longitudinal sectional view taken substantially along the plane of line 19—19 of Figure 5;

Figure 20 is a detail perspective view of an element employed in the brush and impeller assembly;

Figure 21 is a detail diagrammatic view of the automatic hydraulic brush of the present invention and showing the elements of the brush in "shower" position;

Figure 22 is a view similar to Figure 21 but wherein the elements are shown in the "soaping" position;

Figure 23 is a view similar to Figures 21 and 22 and showing the elements of the brush in "massage position;

Figure 24 is a vertical transverse sectional view taken substantially along the plane of line 15—15 of Figure 4 but showing a modified second valve and operating means therefor;

Figure 25 is a detailed end view of the modified cap for the casing of the first valve and showing the pinion associated therewith for effecting reciprocating movement of the rack on the second valve which controls the flow through the inlet conduit;

Figure 26 is a detailed perspective view of the modified form of second valve employed with the automatic hydraulic brush of the present invention; and Figure 27 is a fragmentary, enlarged view in vertical section of the brush, casing, the connections between the brush and impeller shaft, and the pressure urged devices for controlling the passage of water into the brush.

Figure 4:
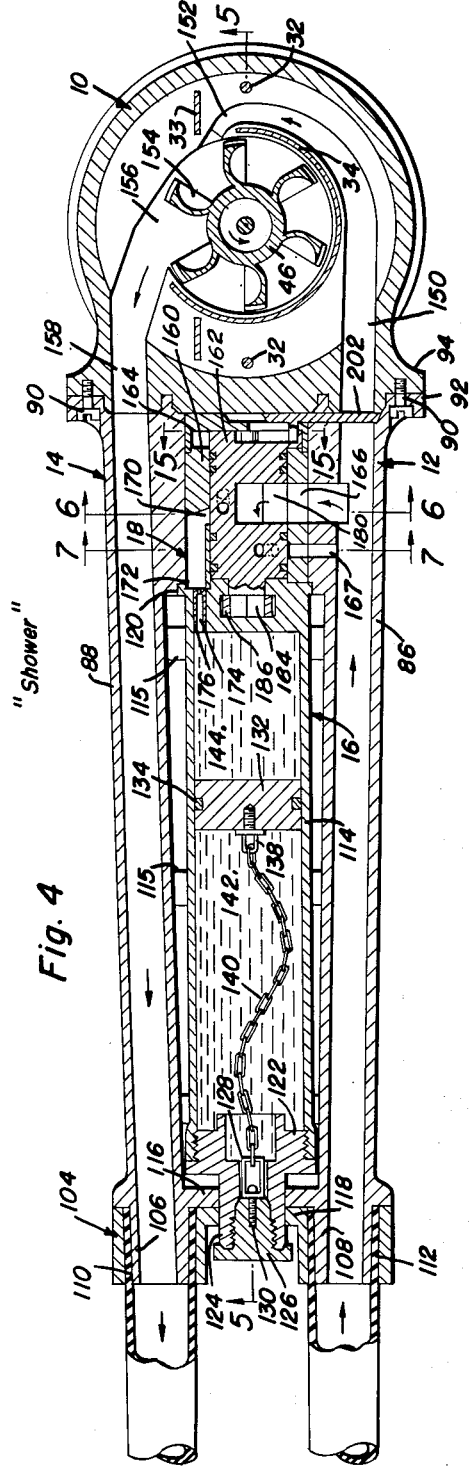
Figure 4 is a horizontal longitudinal sectional view through the automatic hydraulic brush of Figure 1 and showing the valve in "shower" position.

Referring more particularly to the drawings, wherein like numerals designate like parts throughout, and looking at Figures 1 through 5, it will be seen that the automatic hydraulic brush is comprised of an impeller and casing 10, inlet and outlet conduits 12 and 14 associated with the impeller and casing 10, soaping means 16 comprised of the cylinder and piston arrangement and the valve means 18 which is manually operated for controlling the hydraulic brush for changing the brush from "shower" position to "massage" position or to "soaping" position, as desired. The impeller and housing 10 also has a brush 20 associated for rotation therewith.

The impeller and housing 10 is comprised of a substantially circular casing 22 having a recess 24 formed therein for receiving the upper casing element 26 whereby the recesses 28 and 30 formed in the casing 22 and upper casing element 26 provide an impeller-receiving recess. The upper casing element 26 has a pair of annular ridges 32 and 34 for engagement in cooperating recesses in the impeller casing 22 to provide tight cooperation between these two elements. An annular gasket 36 is disposed over the upper casing element 26 and a cap 38 is threadably engaged within the casing 22 for abutment against the gasket 36.

The cap 38 has a first recess 40 formed therein and receiving a roller bearing 42. The cap is also formed with a pair of exteriorly disposed recesses 44 whereby a tool may be received for effecting rotation of the cap when it is desired to insert or remove the cap from the casing 22.

An impeller 46 integral with a shaft 48 is rotatably received within the impeller casing 22, the upper end of the shaft 48 being rotatably received within the roller bearings 42 while the lower end of the shaft 48 is rotatably received within the bore 47 of the casing 22.

The lower end of the shaft 48 has a sleeve 50 threadably engaged thereon, the upper end of the sleeve 50 retaining the cylindrical element 52 supported thereby. The member 52 comprises a tubular central portion received on a squared portion of the shaft 48 and having an annular portion 54 extending therefrom at its lower end and terminating in a plurality of upwardly angulated ends 53. The upper end of the tubular sleeve 52 has a plurality of fingers 56 extending therefrom.

A brush disk 58 is rotatably supported by the casing 22 and has a bearing portion 60 rotatably engaged on the roller bearing 62 received in a recess within the casing 22 at its lower end. The inner lower annular surface of the disk 58 has a member 64 engaged thereagainst. The member 64 is best shown in Figure 20 as comprising an annular ring 66 having a plurality of upstanding elements 68. Each of the elements 68 has an aperture formed therethrough adjacent its upper end at 70. The disk 66 is of annular form and has beveled faces 72 and 74 formed at the inner and outer upper edges thereof.

The annular ring 66 is engaged against the under side of the disk 58 for supporting the same, while the elements 68 extend upwardly and are connected to the fingers 56 of the member 52 for support thereby. The fingers 56 are substantially resilient whereby the annular disk 66 may be downwardly urged by pressure whereby flow of liquid may pass from the passageway 76 in the casing 22 past the annular ring 66 and out through the brush.

The brush 20 is further comprised of the brush member 78 which has an upper, interiorly threaded portion 80 adapted to be threadably engaged on the annular portion 82 of the disk 58. The brush element 78 also has a plurality of bristles 84 or the like secured thereto on its lower surface and bottom liquid discharge ports 78'.

The inlet and outlet conduits 12 and 14 are comprised of tubular members 86 and 88 which are fixedly secured to the impeller casing 22 by means of the screws 90 which are engaged through the flanges 92 and 94 formed on the tubular elements 86 and 88 and the impeller casing 22, respectively.

The tubular elements 86 and 88 have a substantially cylindrical body portion 96 joining the two at their ends adjacent to the impeller casing, the tubular elements 86 and 88 and the substantially cylindrical body portion 96 terminating in the flange 92 for abutment against the impeller casing 22 and its flange 94.

The opposite ends of the tubular elements 86 and 88 terminate in an annular flange 98 to which supply and exhaust conduits 100 and 102 can be secured by means of the connector 104 over the tubular ends 106 and 108 and the resilient pipe ends 110 and 112.

A substantially cylindrical housing 114 is supported between the tubular elements 86 and 88 and has its ends supported by the transverse wall 116 and the transverse wall 118 of the connector 104, the other end of the substantially cylindrical housing 114 being supported in the annular groove 120 formed in the substantially cylindrical body portion 96.

The soaping means 16 is comprised of the substantially cylindrical housing 114 which has one end thereof closed by the closure 122 which is formed with a tubular portion 124 having a closure plug 126 threadably engaged therein. The closure plug 126 has a ring 128 secured thereto by means of the screw 130. A piston 132 is reciprocably disposed within the substantially cylindrical housing 114 and has an annular sealing ring 134 associated therewith for cooperation with the inner wall of the substantially cylindrical housing. An eyelet 138 is secured to the piston 132 and the flexible chain 140 interconnects the loop 128 with the eyelet 138 for limiting the movement of the piston within the substantially cylindrical housing.

For purposes of description, the chamber on one side of the piston 132 will be called the first chamber 142, while the chamber on the opposite side of the piston 132 will be termed the second chamber 144. The chamber 142 is adapted to be selectively communicated with the inlet conduit 86 whereby water pressure may be urged against the piston 132 for moving it toward the right. The second chamber 144 is adapted to receive liquid soap for a purpose to be hereinafter more fully explained.

Figure 5:
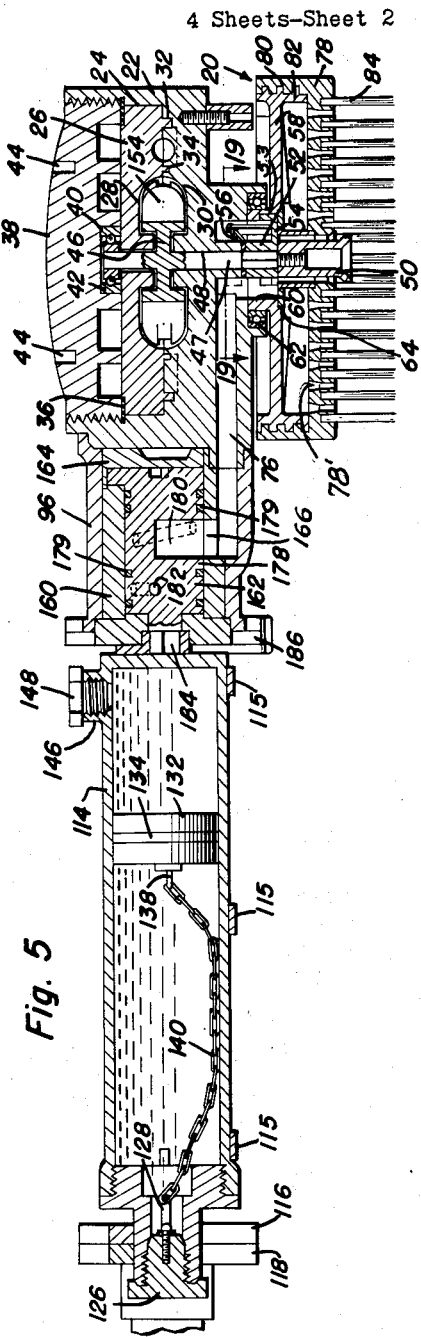
Figure 5 is a vertical longitudinal sectional view taken substantially along the plane of line 5—5 of Figure 4.

Figure 5 shows the substantially cylindrical housing 114 formed with a boss 146 having a closure plug 148 threadably engaged therein, the opening through the boss 146 being provided for filling the second chamber 144 with liquid soap when the same has been substantially used.

Looking once again at the Figures 4 and 5, it will be seen that the impeller casing 22 is formed with a first passageway 150 which is connected to the inlet conduit 86 and gradually reduces in cross-sectional area to the point 152 which forms a nozzle immediately preceding the entry of the water into the impeller recess for engagement with the impeller blade 154. The impeller recess 30 has an enlarged passageway 156 which communicates with the back side of the impeller blade 154 and gradually reduces in cross-sectional area to the point 158 where the second passageway 158 communicates with the outlet conduit 88.

Received within the cylindrical body portion 96 is a tubular valve casing 160 which rotatably receives the rotatable valve plug 162. The valve casing 160 has a cap 164 engaged on the end adjacent the impeller casing 22, and the cap 164 is adapted to abut the juxtaposed end of the rotatable valve plug 162.

The valve casing 160 is of tubular form and has a first rectangular opening 166 formed through the wall thereof with a second aperture 168 formed adjacent thereto to provide communication between the interior and exterior of the casing 160. A portion of the casing 160 substantially opposite to the openings 166 and 168 is formed with an opening 170 which communicates with an end portion of the casing 160 by way of a longitudinal passageway 172. The passageway 172 communicates with the second chamber 144 through the passageway 174 which has a metering tube 176 disposed therein.

The rotatable valve plug 162 is best shown in Figure 16 as comprising a cylindrical portion 178 having a right angled, transversely rectangular recess 180 which is adapted to be selectively cooperable with the rectangular opening 166 of the casing 160, a circular passageway 182 being formed in the plug 162 for selective communication with the aperture 168 of the casing 160. One end of the cylindrical portion 178 is formed with a non-circular extension 184 which is adapted to receive a manual operating handle 186 whereby the valve can be selectively rotated to each of its three positions. The opposite end of the rotatable valve plug 178 is formed with an enlarged flange 188 which has a pair of faces 190 and 192 adapted to selectively engage with the extension 194 of the tubular casing 160 for selectively effecting rotation of the tubular casing upon predetermined rotational movement of the valve plug 178.

The cap 164 has a substantially annular portion 196 which is adapted to rotatably receive the flange 188 of the rotatable plug 178. The cap 164 is also formed with an elongated opening 198 and a recessed portion 200 which is adapted to reciprocably receive the second valve 202 which has a pin 204 laterally extending therefrom for engagement in the elongated opening 198.

As best seen in Figure 15, the end flange 188 of the rotatable plug 178 is formed with a groove 206 whereby the pin 204 which extends through the elongated opening 198 can be engaged in the groove 206 for reciprocation upon rotation of the valve plug 178.

Figures 16 and 17 show the valve casing 160 as formed with an extension portion 208 formed with a groove 210 which communicates with the passageway 172, as shown in Figure 14.

In Figures 24 and 25, the valve plug 178' is shown as formed with a pinion 212 integrally formed with the flange portion 188'. The second valve 202' is formed with a rack 214 which is adapted to engage the pinion 212, the inner end 216 of the second valve 202' being engaged in the elongated rectangular recess 200' of the cap 196', whereby rotation of the valve plug 178' effects reciprocation of the second valve 202' for selectively opening and closing communication through the inlet conduit 86'.

As best shown in diagrammatic form in Figure 21, the automatic hydraulic brush is in the "shower" position with the rotatable valve plug 162 providing direct communication between the inlet conduit 86 and the passageway 76, flow being through the rectangular opening 166 of the casing 160 and the rectangular opening 180 of the valve plug 178 and out through the passageway 76. Actually, the flow is shown in Figure 5 as passing from the rectangular openings of the plug and casing and from the inlet conduit to the passageway 76 in the impeller casing 22 and out through the brush 20. Thus, a clear flow of water will be provided through the brush so that the brush functions as a shower.

Figures 6 and 7 are sectional views taken through Figure 4 and showing the valve plug in relationship for providing the fluid flow for shower.

It is also to be noted that the second valve 202 is outwardly urged when the valve plug is in the "shower" position, whereby the inlet conduit 86 is not connected to the first passageway 150 whereby the impeller 46 cannot be driven.

When it is desired to effect soaping by the automatic brush, the valve plug is rotated to the position shown in Figure 22, and also Figures 8, 10 whereby the passage 182 through the valve plug and the opening 168 in the casing together with opening 167 provide communication between the inlet conduit 86 and the tubular conduit 87 which is communicated with the pressure end of the cylindrical housing 114 for effecting longitudinal movement of the piston 132 whereby the liquid soap is forced from the second chamber through the metering tube 176 and into the passageway 172 for communication with the passageway 76 through the passageway 183 in the valve plug 162 (see Figure 9), thereby providing soap solution to the brush for soaping purposes.

In this position of the valve plug 162 the water under pressure in the inlet conduit 86 passes through opening 167 in the body portion 96, the opening 168 in the valve casing 160, passageway 182 in the valve plug 162 and the passageway 172 in the casing 160 through a metering tube 177 in the tubular conduit 87 on the cylindrical housing 114, and through said conduit 87 to the back of the piston 132 to force the soap solution out of the chamber 144 through the metering tube 176 into the passage 172 in the casing 160. The water, or liquid, under back pressure in the tubular conduit 87 passes back into the passageway 172 through metering tube 177 to mix with the soap solution in the passageway 172 and the mixture passes through passageway 183 in the valve plug 162 into the passageway 76 through radial opening 166 in the valve casing 160 and through the passageway 76 to the brush 20. The metering tube 177 reduces the pressure of the water or liquid so that pressure will not be equalized on both sides of the piston. As shown in Figure 22 while soaping is being effected the valve 202 is open so that the brush 20 is rotated.

Figure 8 shows the valve plug and casing in the relationship for soaping, while Figures 9 and 10 show the passageway through the valve plug by means of cross-sectional views through Figure 8.

When it is desired to employ the automatic hydraulic brush as a massage device, the valve plug is again rotated by means of the manual handle 186 to the position shown in Figures 11, 12 and 13, whereby communication is prevented between the inlet conduit 86 and the cylindrical housing 114 and also the passageway 76. However, direct flow is permitted through the inlet conduit 86 to the passageway 150 and impeller 46 for rotating the same and thence for exhaust through the outlet conduit 88. Thus, the brush 20 will be rotated upon rotation of the impeller for massage purposes.

In view of the foregoing, it is believed that a device has been provided which will accomplish all of the objects hereinabove set forth. Furthermore, it is believed that various mechanical modifications and substitutions could be made which would fall within the scope of the appended claims.

Having described the invention, what is claimed as new is:

1. An automatic hydraulic brush comprising an impeller casing having a rotary impeller therein provided externally of said impeller casing with a brush rotatable thereby, a liquid pressure inlet line connected to said impeller casing to feed liquid under pressure to the impeller casing to rotate the impeller, a substantially cylindrical body on said impeller casing, a substantially cylindrical housing connected to said body for containing liquid soap and having a soap discharge outlet opening into said body, a pressure responsive piston in said housing movable forwardly under pressure behind the same to force liquid soap out of said discharge outlet, a liquid pressure conduit in said body and extending along said housing and opening thereinto for introducing liquid under pressure into said housing behind said piston, a liquid and soap discharge passageway in said body and impeller casing discharging into said brush, a substantially cylindrical valve casing in said body having a peripheral soap and liquid mixing passageway therein with which said soap discharge outlet communicates and which opens into said liquid pressure conduit and having a radial opening therein communicating with said pressure inlet line, and a second radial opening therein communicating with said liquid and soap discharge passageway and with the liquid pressure inlet line, a rotary valve plug in said valve casing having openings therethrough and rotatable into one set position in which one of the openings therein communicates the first radial opening in the valve casing with the liquid pressure conduit and another opening in said plug communicates the soap and liquid mixing passageway with the soap and liquid discharge passageway, and a back pressure liquid outlet extending from said pressure conduit to said mixing passageway for admitting fluid under back pressure into the mixing passageway to mix with liquid soap in said mixing passageway.

2. An automatic hydraulic brush according to claim 1, said valve plug having a third through opening therein and being rotatable into a second set position to close the first mentioned opening in the valve casing and communicate the second mentioned opening with the liquid and soap discharge passageway.

3. An automatic hydraulic brush as in claim 2, and a slide valve operatively connected to said valve plug for automatic operation to close said inlet line to the impeller casing when said valve plug is rotated into its second position.

References Cited in the file of this patent

UNITED STATES PATENTS

| | | |
|---|---|---|
| 1,166,482 | Reiche | Jan. 4, 1916 |
| 1,691,524 | Maycen | Nov. 13, 1928 |
| 1,881,129 | Peek et al. | Oct. 4, 1932 |
| 2,168,692 | Vidal | Aug. 8, 1939 |
| 2,659,915 | Sears | Nov. 24, 1953 |